US008667201B2

(12) United States Patent
Sander et al.

(10) Patent No.: US 8,667,201 B2
(45) Date of Patent: Mar. 4, 2014

(54) COMPUTER SYSTEM INTERRUPT HANDLING

(75) Inventors: Benjamin Thomas Sander, Austin, TX (US); Michael Houston, Cupertino, CA (US); Newton Cheung, San Jose, CA (US); Keith Lowery, Bothell, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 5 days.

(21) Appl. No.: 13/292,721

(22) Filed: Nov. 9, 2011

(65) Prior Publication Data
US 2012/0179851 A1 Jul. 12, 2012

Related U.S. Application Data

(60) Provisional application No. 61/423,483, filed on Dec. 15, 2010.

(51) Int. Cl.
*G06F 13/24* (2006.01)
(52) U.S. Cl.
CPC .................................. *G06F 13/24* (2013.01)
USPC .......................................... 710/263; 710/260
(58) Field of Classification Search
USPC ........................................................ 710/260
See application file for complete search history.

(56) References Cited

U.S. PATENT DOCUMENTS

| 7,340,547 | B1* | 3/2008 | Ledebohm ................... 710/260 |
| 8,255,603 | B2* | 8/2012 | Chung et al. ................. 710/268 |
| 8,285,904 | B2* | 10/2012 | Strauss et al. ................ 710/268 |
| 2004/0015627 | A1 | 1/2004 | Desoli et al. |
| 2008/0168201 | A1* | 7/2008 | de Cesare et al. ............ 710/260 |
| 2008/0278482 | A1 | 11/2008 | Farmanbar et al. |
| 2009/0153571 | A1* | 6/2009 | Crow et al. ................... 345/506 |
| 2009/0153573 | A1* | 6/2009 | Crow et al. ................... 345/522 |
| 2011/0040913 | A1* | 2/2011 | Chung et al. ................. 710/264 |
| 2011/0040915 | A1* | 2/2011 | Strauss et al. ................ 710/267 |
| 2013/0057563 | A1* | 3/2013 | Persson ........................ 345/522 |
| 2013/0067133 | A1* | 3/2013 | Mansell et al. ............... 710/267 |

OTHER PUBLICATIONS

Wong et al.; "Pangaea: a tightly-coupled IA32 heterogeneous chip multiprocessor"; PACT '08 Proceedings of the 17th international conference of Parallel architectures and compilation techniques; Oct. 25-29, 2008; pp. 52-61.*
International Search Report and Written Opinion for International Application No. PCT/US2011/064169, United States Patent and Trademark Office, United States, mailed on Apr. 17, 2012.

* cited by examiner

*Primary Examiner* — Ryan Stiglic
(74) *Attorney, Agent, or Firm* — Sterne, Kessler, Goldstein & Fox P.L.L.C.

(57) ABSTRACT

A system, method and article of manufacture for an accelerated processing device (APD) to request a central processing unit (CPU) to process a task, comprising enqueuing a plurality of tasks on a queue using the APD, generating a user-level interrupt and transmitting to the CPU the plurality of tasks in the queue using an interrupt handler associated with a CPU thread.

25 Claims, 5 Drawing Sheets

COMPUTER SYSTEM INTERRUPT HANDLING

CROSS REFERENCE TO RELATED APPLICATIONS

This application claims the benefit of U.S. Provisional Application No. 61/423,483, filed on Dec. 15, 2010 and is incorporated by reference in its entirety.

BACKGROUND

1. Field of the Invention

The present invention is generally directed to computing systems. More particularly, the present invention is directed to processing computing system interrupts.

2. Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to 2D and 3D graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) providing quality of service (QoS) guarantees between processes, (iv) programming model, and (v) compiling to multiple target instruction set architectures (ISAs)—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

In computing systems that include a CPU and a GPU, certain commands cannot execute on a GPU efficiently, and require CPU's attention. In a conventional system, a GPU issues a request to a CPU to processes commands and instructions. When the CPU receives the request, the CPU invokes an operating system ("OS") to issue an interrupt and processes the request using an OS. However, invoking an OS to process each request from a GPU is expensive and inefficient, particularly when multiple working items within the GPU issue repetitive requests.

SUMMARY OF EMBODIMENTS

What is needed, therefore, are systems and methods for improved processing of the GPU requests by a CPU.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof.

Embodiments of the invention, in certain circumstances, include a method, system and article of manufacture for an APD to request a CPU to process a plurality of tasks. The method comprises enqueuing the plurality of tasks on a queue using the APD, generating a user-level interrupt and transmitting to the CPU the plurality of tasks in the queue using an interrupt handler associated with a CPU thread.

Embodiments of the invention also include a method, system and article of manufacture for a CPU to process a plurality of tasks from an APD, comprising receiving a user-level interrupt from the APD, accessing an interrupt handler associated with the user-level interrupt on a CPU thread, wherein the interrupt handler accesses a queue dequeuing the plurality of tasks from the queue, wherein the plurality of tasks where enqueued using the APD and processing the dequeued tasks.

Additional features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

The present invention will be described with reference to the accompanying drawings. Generally, the drawing in which an element first appears is typically indicated by the leftmost digit(s) in the corresponding reference number.

DETAILED DESCRIPTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
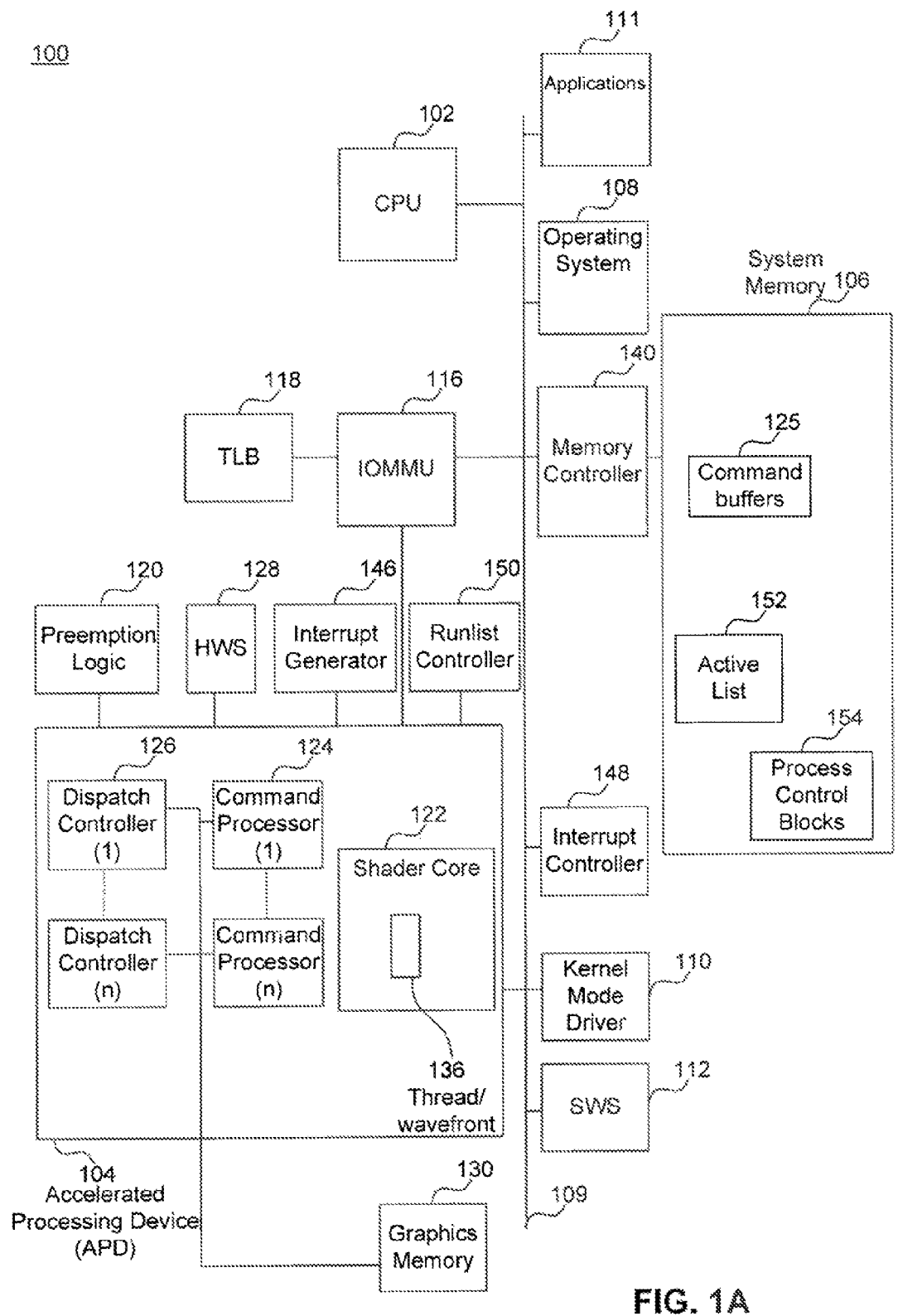
FIG. 1A is an illustrative block diagram of a processing system in accordance with embodiments of the present invention.

FIG. 1A is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface.

Device drivers, particularly on modern Microsoft Windows® platforms, can run in kernel-mode (Ring 0) or in user-mode (Ring 3). The primary benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user module only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the instruction set architecture (ISA). A command may be executed by a special processor such a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD. This function is also referred to as a kernel, a shader, a shader program, or a program.

In one illustrative embodiment, each APD compute unit (e.g., SIMD processing core) can execute a respective instantiation of a particular work-item to process incoming data. A work-item is one of a collection is of parallel executions of a kernel invoked on a device by a command. A work-item can be executed by one or more processing elements as part of a work-group executing on an APD compute unit.

A work-item is distinguished from other executions within the collection by its global ID and local ID. In one example, a subset of work-items in a workgroup that execute simultaneously together on a SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and work-group barriers.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can actually take a unique code path through the kernel. Partially populated wavefronts can be processed when a full set of work-items is not available at wavefront start time. For example, shader core 122 can simultaneously execute a predetermined number of wavefronts 136, each wavefront 136 comprising a multiple work-items.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or "n" number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a command executed by a dispatch controller that uses the context state to initiate the start of the execution of a kernel for a set of work groups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run list 150. The run list management logic of HWS 128 is sometimes referred to as a run list controller (RLC).

In various embodiments of the present invention, when HWS 128 initiates the execution of a process from run list 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 resources and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and/or a final state. An initial state is a starting point for a machine to process an input data set according to a programming order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set.

Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, operating system functions, processing logic commands, and system software can reside in memory 106. Control logic commands fundamental to operating system 108 will generally reside in memory 106 during execution. Other software commands, including, for example, kernel mode driver 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, advanced graphics port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. CPU 102 can seamlessly send selected commands for processing on the APD 104. In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, operating system, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
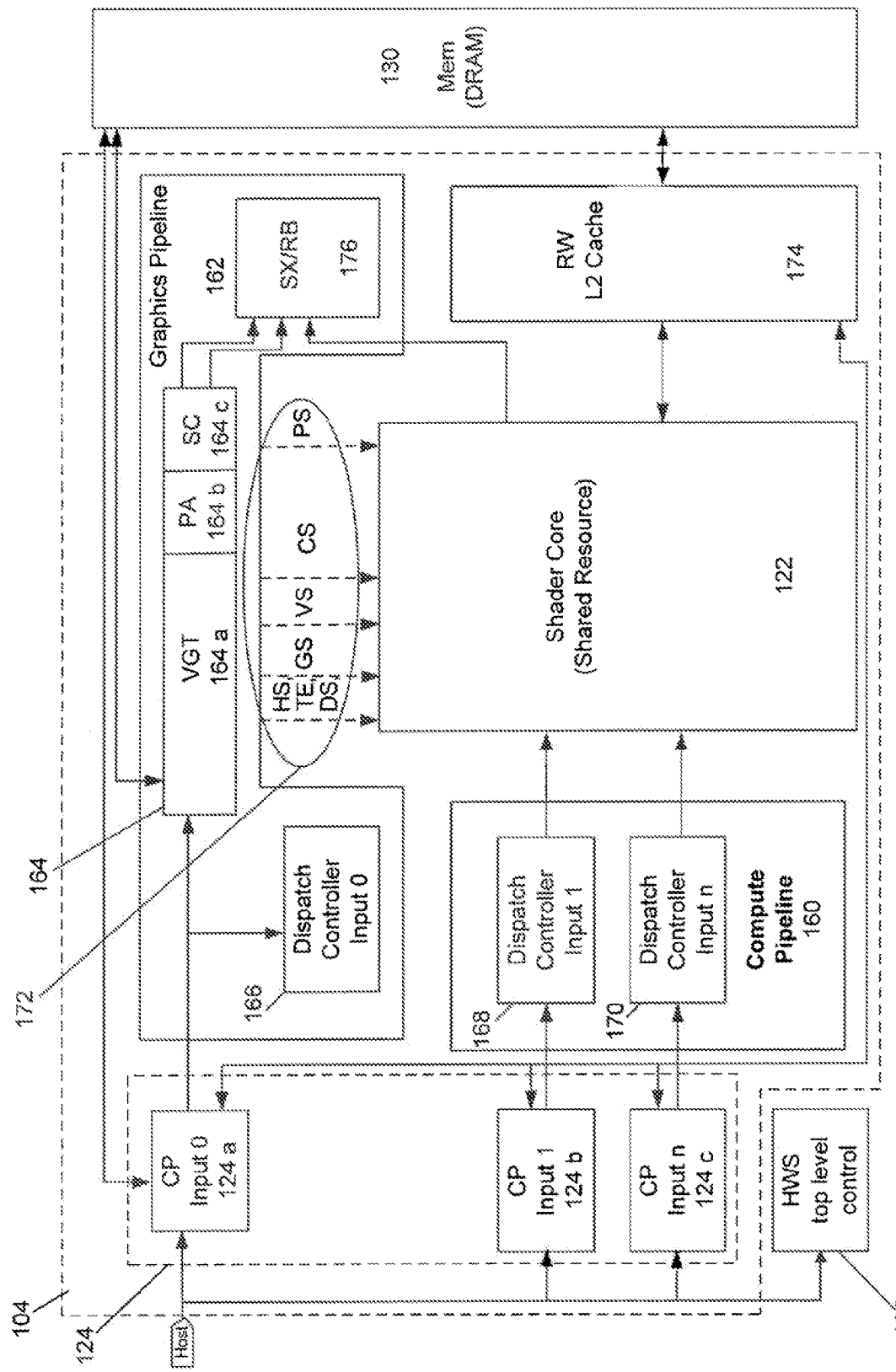
FIG. 1B is an illustrative block diagram illustration of an APD illustrated in FIG. 1A.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Other implementations can be used that would also be within the spirit and scope of the present invention.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs 168 and 170 is configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. An exception is for graphics work in shader core 122, which can be context switched.

After the processing of work within graphics pipeline 162 has been completed, the completed work is processed through a render back unit 176, which does depth and color calculations, and then writes its final results to memory 130.

Shader core 122 can be shared by graphics pipeline 162 and compute pipeline 160. Shader core 122 can be a general processor configured to run wavefronts. In one example, all work within compute pipeline 160 is processed within shader core 122. Shader core 122 runs programmable software code and includes various forms of data, such as state data.

A disruption in the QoS occurs when all work-items are unable to access APD resources. Embodiments of the present invention facilitate efficiently and simultaneously launching two or more tasks to resources within APD 104, enabling all work-items to access various APD resources. In one embodiment, an APD input scheme enables all work-items to have access to the APD's resources in parallel by managing the APD's workload. When the APD's workload approaches maximum levels, (e.g., during attainment of maximum I/O rates), this APD input scheme assists in that otherwise unused processing resources can be simultaneously utilized in many scenarios. A serial input stream, for example, can be abstracted to appear as parallel simultaneous inputs to the APD.

By way of example, each of the CPs 124 can have one or more tasks to submit as inputs to other resources within APD 104, where each task can represent multiple wavefronts. After a first task is submitted as an input, this task may be allowed to ramp up, over a period of time, to utilize all the APD resources necessary for completion of the task. By itself, this first task may or may not reach a maximum APD utilization threshold. However, as other tasks are enqueued and are waiting to be processed within the APD 104, allocation of the APD resources can be managed to ensure that all of the tasks can simultaneously use the APD 104, each achieving a percentage of the APD's maximum utilization. This simultaneous use of the APD 104 by multiple tasks, and their combined utilization percentages, ensures that a predetermined maximum APD utilization threshold is achieved.

Figure 2:
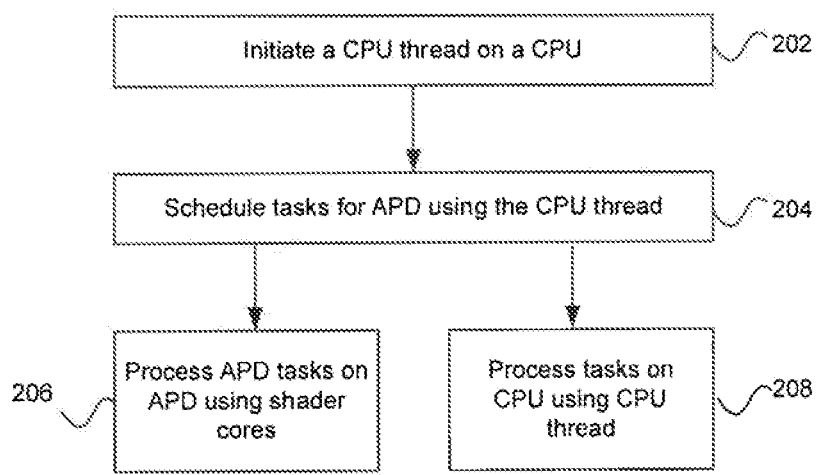
FIG. 2 is an illustrative flowchart of an initialization process of a CPU thread capable of processing a user-level interrupts ("ULI").

FIG. 2 is an illustrative flowchart of an initialization process of a CPU thread capable of processing ULIs.

At operation 202, CPU 102 initializes a CPU thread. During the initialization process, CPU 102 programs a hardware table with a memory address of a subroutine that is responsible for handling ULIs. CPU 102 also sets the ULI register to a value indicating that a ULI was not received from APD 1104.

At operation 204, the CPU thread schedules tasks for APD 104. At operation 206, APD 104 begins to execute tasks scheduled in operation 204. APD 104 executes the scheduled tasks using one or more shader cores 122, as described herein.

Concurrently, at operation 208, the CPU thread begins to process tasks delegated to the CPU thread by CPU 102. A person skilled in the art will appreciate that the CPU thread executing at operation 208 may be periodically de-scheduled and rescheduled by CPU 102.

When APD 104 requires attention from CPU 102, APD 104 issues a ULI.

Figure 3:
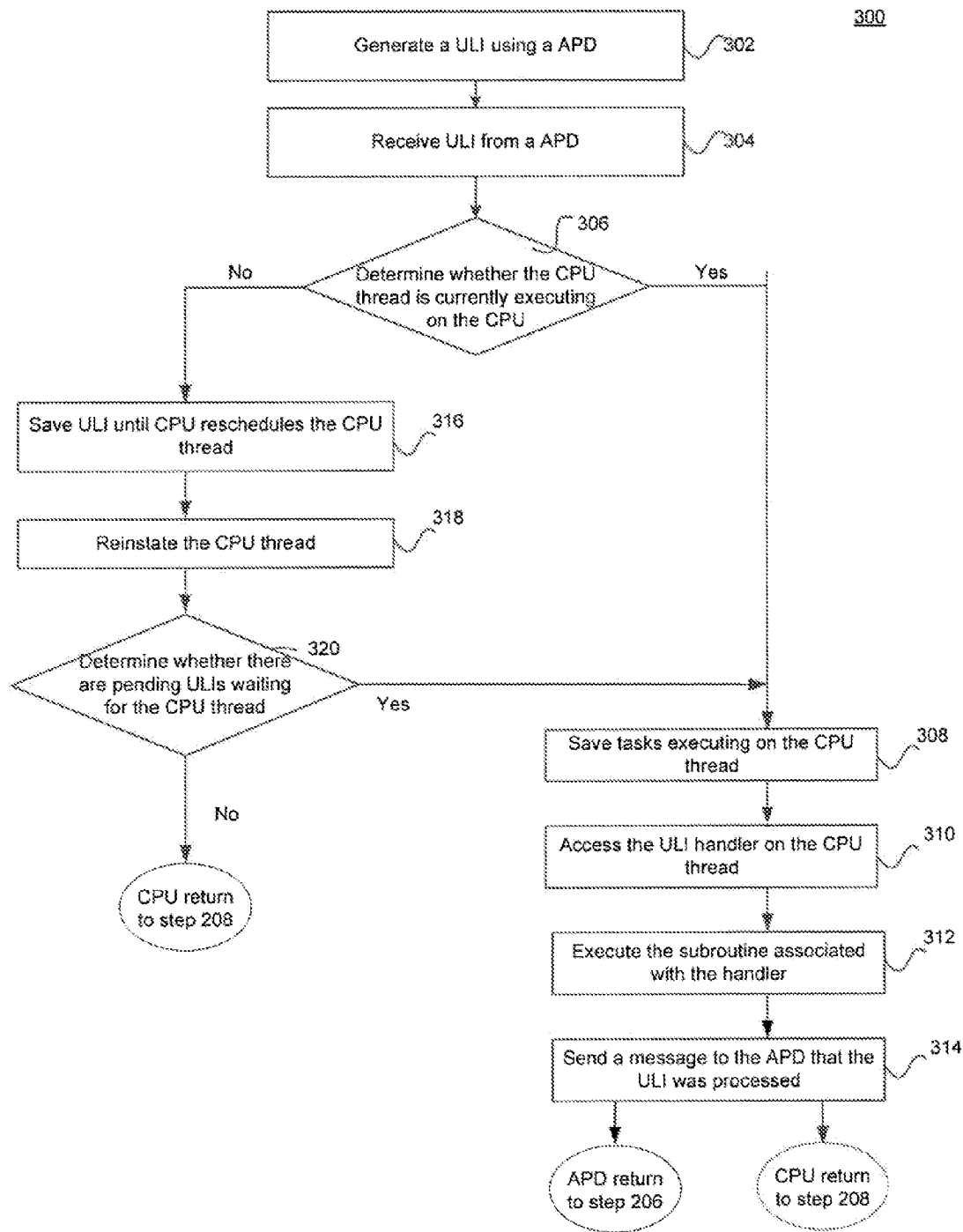
FIG. 3 is an illustrative flowchart of an APD issuing a ULI and CPU processing the APD's request.

FIG. 3 is an illustrative flowchart 300 of an APD issuing a ULI and CPU processing the APD's request. At operation 302, APD 104 requires attention from CPU 102, and issues the ULI. At operation 304, CPU 102 receives the ULI from CPU 104.

At operation 306, CPU 102 determines whether the CPU thread that scheduled tasks on APD 104 in operation 204 is being executed on CPU 102. If the thread is being executed on CPU 102, the flowchart proceeds to operation 308. Otherwise, the flowchart proceeds to operation 318 described herein.

At operation 308, the CPU thread saves its current state in system memory 106. A person skilled in the art will appreciate that current state relates to tasks that thread CPU 102 was processing when it received a ULI from APD 104, and can include registers and other information necessary to reinstate the state of the CPU thread in the future.

At operation 310, the CPU thread accesses the interrupt handler which includes the subroutine. CPU thread accesses the subroutine by accessing the hardware table that stores the memory address of a subroutine.

At operation 312, the CPU thread begins to execute the subroutine, and thus process the ULI request generated by APD 104. As described herein, the subroutine may contain code that enqueues further work for APD 104, so that APD 104 does not remain idle while CPU 102 processes the ULI.

At operation 314, the CPU thread completes processing instructions in the subroutine. The CPU thread signals APD 104 that the requested work is complete using a command buffer 125. After the ULI is complete, the CPU thread returns to operation 208 and APD 104 returns to operation 206.

In a computing environment, CPU 102 processes multiple CPU threads. For example, CPU 102 can schedule and de-schedule CPU threads depending on their priority, number of CPU cores, etc. Typically, when CPU 102 de-schedules a CPU thread, CPU 102 saves the state of the CPU thread's registers using an XSAVE function.

However, even though CPU 102 de-schedules the CPU thread, APD 104 continues to process tasks that the CPU thread launched on APD 104. Because APD 104 continues to process those tasks, APD 104 can issue a ULI when CPU 102 de-scheduled the CPU thread.

In order for the CPU thread to determine that a ULI was received when it was de-scheduled by CPU 102, the ULI event is saved in system memory 106 where it is accessible by KMD 110. When CPU 102 reinstates the CPU thread, KMD 110 indicates that a ULI had occurred. The reinstated CPU thread then vectors off to the subroutine and begins to process the ULI. Typically, CPU 102 reinstates the CPU thread using an XRSTOR function.

Going back to FIG. 3, when CPU 102 determines that a ULI was issued for a de-scheduled CPU thread, CPU 102 proceeds to operation 316.

At operation 316, the ULI is routed to KMD 110 until the CPU 102 reschedules the corresponding CPU thread. In an embodiment, the process identifier ("process ID") that spawned the CPU thread and CPU thread identifier ("thread ID") are also routed to KMD 110 with the ULI. In an alternative embodiment, CPU 102 may save the ULI, the process ID and thread ID in system memory 106 and avoid using KMD 110.

At operation 318, CPU 102 reinstates the CPU thread. CPU 102 retrieves the CPU thread's state from system memory 106 using the XRSTOR function. In one embodiment, CPU 102 may restore the CPU thread at a time which is independent of whether the ULI had been issued to the CPU thread.

In another illustrative embodiment, KMD 110 may cause CPU 102 to reinstate CPU thread more quickly when it receives a ULI for the particular CPU thread. For example, KMD 110 may increase the priority of the CPU thread, thus causing the CPU 102 to reinstate the CPU thread prior to other de-scheduled CPU threads.

At operation 320, CPU thread determines whether any ULIs have been issued by APD 104. If a ULI had been issued for the CPU thread, the exemplary flowchart 300 proceeds to operation 308. Otherwise the CPU thread proceeds to operation 308 as described herein.

When APD 104 requires attention from CPU 102, APD 104 issues a ULI as described herein. In addition to having APD 104 request attention for a single task from CPU 102, APD 104 can also request CPU 102 to process multiple tasks in a single ULI. Prior to APD 104 issuing a ULI, APD 104 enqueues a number of tasks on a public queue. A person skilled in the art will appreciate that a public queue is visible to CPU 102 and CPU 104 processors. In an embodiment, multiple shader cores 122 can enqueue tasks onto a queue.

When APD 104 issues a ULI to CPU 102, the CPU thread vectors off to the interrupt handler which includes a subroutine. The subroutine has access to a public queue, and can dequeue and process the queued tasks. In an embodiment, the CPU thread scans and prioritizes the dequeued tasks prior to processing. For example, the CPU thread can determine how to prioritize tasks based on their priority, task type, specific quality of service, etc.

Figure 4:
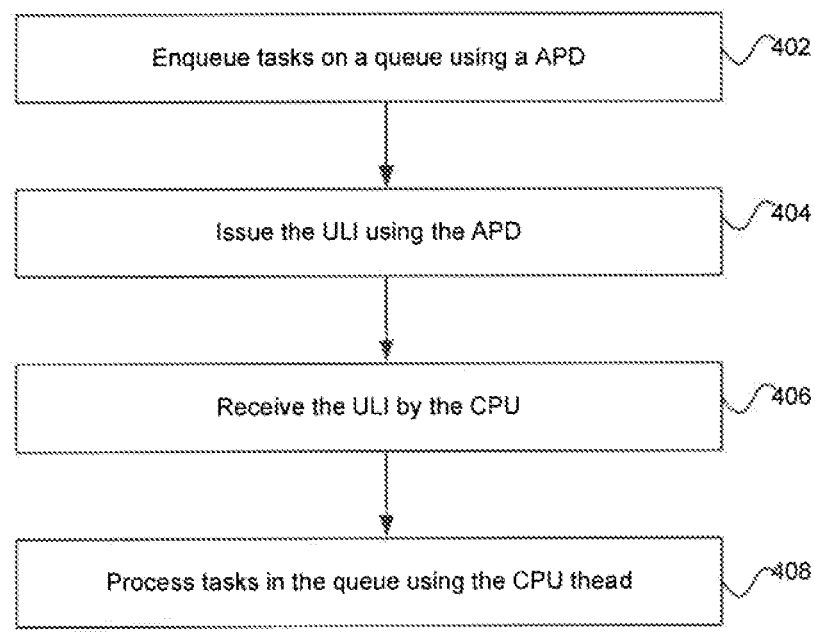
FIG. 4 is an illustrative flowchart of an APD requesting a CPU to process a queue using a ULI.

FIG. 4 is an illustrative flowchart 400 of an APD requesting a CPU to process a queue using a ULI. At operation 402, APD 104 enqueues tasks onto a queue. At operation 404, APD 104 issues a ULI to CPU 102.

At operation 406, CPU 102 receives the ULI from APD 104 and processes the ULI as described herein. When CPU 102 executes or reschedules the CPU thread which scheduled work for APD 104 as described herein, the flowchart proceeds to operation 408.

At operation 408, the CPU thread saves its current workload and vectors off to the subroutine. Inside the subroutine, the CPU thread begins to dequeue and process tasks as described herein. Once the CPU thread completes processing tasks, the CPU thread notifies APD 104 if required and/or returns to processing its saved workload.

Various aspects of the present invention can be implemented by software, firmware, hardware, or a combination thereof. For example, the methods illustrated by flowcharts 200 of FIG. 2, 300 of FIG. 3, 400 of FIG. 4 can be implemented in unified computing system 100 of FIG. 1. Various embodiments of the invention are described in terms of this example unified computing system 100. It would be apparent to a person skilled in the relevant art how to implement the invention using other computer systems and/or computer architectures.

In this document, the terms "computer program medium" and "computer-usable medium" are used to generally refer to media such as a removable storage unit or a hard disk drive. Computer program medium and computer-usable medium can also refer to memories, such as system memory 106 and graphics memory 130, which can be memory semiconductors (e.g., DRAMs, etc.). These computer program products are means for providing software to unified computing system 100.

The invention is also directed to computer program products comprising software stored on any computer-usable medium. Such software, when executed in one or more data processing devices, causes a data processing device(s) to operate as described herein or, as noted above, allows for the synthesis and/or manufacture of computing devices (e.g., ASICs, or processors) to perform embodiments of the present invention described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method enabling an accelerated processing device (APD) to request a central processing unit (CPU) to process a plurality of tasks, comprising:
    enqueuing the plurality of tasks on a queue using the APD, wherein the queue is visible to the CPU;
    generating a user-level interrupt (ULI) using the APD, wherein the ULI activates a CPU thread responsible for processing the tasks; and
    processing, using the CPU thread, the plurality of tasks enqueued using the APD on the CPU.

2. The method of claim 1, further comprising:
    receiving a result from the CPU thread in response to processing the plurality of tasks.

3. The method of claim 1, wherein the plurality of tasks are enqueued using one or more shader cores.

4. A method for a central processing unit (CPU) to process a plurality of tasks from an accelerated processing device (APD), comprising:
    receiving a user-level interrupt (ULI) from the APD, wherein the ULI is associated with a queue enqueued by the APD with the plurality of tasks and wherein the queue is visible to the CPU;
    accessing an interrupt handler associated with the ULI, wherein the interrupt handler causes a CPU thread to accesses the queue enqueued with the plurality of tasks; and
    processing the plurality of tasks using the CPU thread on the CPU.

5. The method of claim 4, further comprising:
    transmitting a result from the CPU thread to the APD in response to processing the task.

6. The method of claim 4, wherein the interrupt handler accesses a subroutine that provides work to the APD while the plurality of tasks are being processed.

7. The method of claim 4, wherein a subroutine queries a status on the APD.

8. The method of claim 4, wherein the ULI is an asynchronous interrupt.

9. The method of claim 4, wherein the CPU thread includes a register indicating when the ULI occurs.

10. The method of claim 4, further comprising the interrupt handler scanning the plurality of tasks.

11. The method of claim 10, further comprising prioritizing the processing of the plurality of tasks based on the scanning.

12. The method of claim 4, further comprising transmitting a result of the processed tasks to the APD.

13. A system enabling an accelerated processing device (APD) to request a control processing unit (CPU) to process a plurality of tasks, comprising:
    a memory configured to store a store visible to the APD and the CPU; and
    the APD configured to:
        enqueue the plurality of tasks onto the queue;
        generate a user-level interrupt (ULI), wherein the ULI activates a CPU thread responsible for processing the plurality of tasks; and
        process, using the CPU thread, the plurality of tasks enqueued using the APD on the CPU.

14. The system of claim 13, wherein the APD receives a result from the CPU thread in response to the CPU processing the plurality of tasks.

15. The system of claim 13, wherein the plurality of tasks are enqueued using one or more shader cores within the APD.

16. The system enabling a control processing unit (CPU) to process a plurality of tasks from an accelerated processing device (APD), comprising:
    a memory configured to store queue visible to the CPU and the APD; and
    a CPU thread executing on the CPU and configured to:
        activate, in response to receiving a user-level interrupt (ULI) indicating that the queue enqueued by the APD with the plurality of tasks requires processing;
        access an interrupt handler associated with the ULI, wherein the interrupt handler accesses the plurality of tasks stored in the queue; and
        cause the CPU to processes the plurality of tasks.

17. The system of claim 16, wherein the CPU transmits a result from the CPU thread to the APD in response to processing the plurality of tasks.

18. The system of claim 16, wherein the interrupt handler accesses a subroutine that provides work to the APD while the plurality of tasks are being processed.

19. The system of claim 16, wherein a subroutine queries a status on the APD.

20. The system of claim 16, wherein the ULI is an asynchronous interrupt.

21. The system of claim 16, wherein the CPU thread includes a register indicating when the ULI occurs.

22. The system of claim 16, wherein the CPU thread is configured to scan the plurality of tasks.

23. The system of claim 16, further comprising prioritizing the processing of the plurality of tasks in the queue based on the scanning.

24. A computer-readable medium having instructions recorded thereon that, if executed by a computing device, cause the computing device to perform operations enabling an accelerated processing device (APD) to request a central processing unit (CPU) to process a plurality of tasks, the operations comprising:
    enqueuing the plurality of tasks on a queue using the APD, wherein the queue is visible to the CPU;
    generating a user-level interrupt (ULI) using the APD, wherein the ULI activates a CPU thread responsible for processing the tasks; and
    processing, using the CPU thread, the plurality of tasks enqueued using the APD on the CPU.

25. A computer-readable medium having instructions recorded thereon that, if executed by a computing device, cause the computing device to perform operations enabling a central processing unit (CPU) to process a plurality of tasks from an accelerated processing device (APD), comprising:
    receiving a user-level interrupt (ULI) from the APD, wherein the ULI is associated with a queue enqueued by the APD with the plurality of tasks and wherein the queue is visible to the CPU;
    accessing an interrupt handler associated with the ULI wherein the interrupt handler causes a CPU thread to accesses the queue enqueued with the plurality of tasks; and
    processing the plurality of tasks using the CPU thread on the CPU.

* * * * *

UNITED STATES PATENT AND TRADEMARK OFFICE
CERTIFICATE OF CORRECTION

PATENT NO.       : 8,667,201 B2  
APPLICATION NO.  : 13/292721  
DATED            : March 4, 2014  
INVENTOR(S)      : Sander et al.

It is certified that error appears in the above-identified patent and that said Letters Patent is hereby corrected as shown below:

In the Claims:

<u>Column 13</u>

Line 52 please replace "store a store" with --stores a queue--.

<u>Column 14</u>

Line 6 please replace "to store" with --to a store--.

Signed and Sealed this  
Thirtieth Day of September, 2014

Michelle K. Lee  
*Deputy Director of the United States Patent and Trademark Office*